United States Patent [19]

Bone

[11] 4,039,078

[45] Aug. 2, 1977

[54] FASTENER ATTACHMENT STOCK

[75] Inventor: Arnold R. Bone, Needham, Mass.

[73] Assignee: Dennison Manufacturing Company, Framingham, Mass.

[21] Appl. No.: 594,736

[22] Filed: July 10, 1975

Related U.S. Application Data

[62] Division of Ser. No. 347,678, April 4, 1973, abandoned.

[51] Int. Cl.$^2$ ........................ B65D 85/24; B23P 11/02

[52] U.S. Cl. ........................ 206/343; 206/820; 206/380; 29/450

[58] Field of Search ............... 206/230, 238, 340, 343, 206/345, 346, 348, 380, 820; 29/450

[56] References Cited

U.S. PATENT DOCUMENTS

| | | | |
|---|---|---|---|
| 111,051 | 1/1871 | Fowler | 206/380 |
| 1,405,357 | 1/1922 | Tiffany | 206/380 |
| 2,784,405 | 3/1957 | Working, Jr. | 206/347 |
| 3,241,658 | 3/1966 | Anderson | 206/820 |
| 3,444,597 | 5/1969 | Bone | 24/150 |
| 3,850,297 | 11/1974 | Merser | 206/380 |
| 3,875,648 | 4/1975 | Bone | 29/450 |
| 3,906,611 | 9/1975 | Merser | 29/450 |

*Primary Examiner*—William Price
*Assistant Examiner*—Douglas B. Farrow
*Attorney, Agent, or Firm*—George E. Kersey

[57] ABSTRACT

Fastener attachment stock to be separated or divided, e.g., by cutting, severing, rupturing or shearing to provide a plurality of fastener attachment devices each preferably having substantially an H shape. The stock in its most preferred form includes two undivided elongated and continuous plastic side members having a plurality of plastic cross links coupled to and between each of said side members, each of said links being preferably spaced equidistantly apart from each other.

The stock of this invention provides for a completely waste-less or scrap-less fastener attachment dispensing system in the hands of the ultimate user while also permitting the automatic repetitive dispensing of large numbers of fastener attachment devices under positive feed control and at a rapid rate without the necessity of frequent system stock reloadings (as necessitated using the stock of the prior art). The stock of this invention may be fed from a canister therefore containing the stock which may be placed in a roll or other compressed formation for storage thereof.

8 Claims, 57 Drawing Figures

FASTENER ATTACHMENT STOCK

This is a continuation division of application Ser. No. 347,678, filed on 4/4/73 and now abandoned.

BACKGROUND OF THE DISCLOSURE

This invention represents a significant departure and advance in the field of fastener attachment systems as represented by U.S. Pat. Nos. 3,444,597, 3,103,666, 3,470,834 as well as many others.

Over a period of about 10 years a significant new field has been developed using plastic fastener attachment devices to facilitate the coupling of materials together.

The uses have been numerous in both commercial and consumer applications. For example, retail establishments have found great utility for such devices in coupling tags to merchandise, coupling a pair of articles e.g., gloves, shoes, etc., together, or in coupling layers of fabric together with an apparatus such as shown in U.S. Pat. No. 3,103,666.

Consumers and others have also found use for the above mentioned type of plastic fastener attachment devices in the coupling of buttons to clothing with an apparatus such as shown in U.S. Pat. No. 3,470,834.

Although the field has grown quite rapidly in situations where only a few or one fastener attachment device is dispensed, it has been found that there are significant limitations in the use of the devices, as the devices are currently supplied (as stock) for use in production line situations requiring the reliable rapid fire dispensing of devices (one after the other) without the necessity of significant amounts of down time for reloading or for correcting system jamming.

As may be seen in U.S. Pat. No. 3,103,666 each of the fastener attachment members is coupled to a carrier rod by a neck member and is automatically fed into the fastener dispensing apparatus of an indexing wheel which engages a connecting neck member to advance the carrier rod.

While theoretically there is no reason why long lengths of stock such as shown in U.S. Pat. No. 3,103,666 can not be provided, there are practical fabrication problems as well as device stock storage problems which limit the length of the carrier rod and thus the number of attachments which may be carried for subsequent automatic or semi-automatic dispensing. The stock shown in U.S. Pat. No. 3,103,666 also suffered from a signficant disadvantage in that carrier rod and necks represented waste and thus loss in profits as well as a waste disposal problem.

For the foregoing reasons a new and improved wasteless or scrap-less fastener attachment stock capable of being transformed (divided) into literally hundreds or even thousands of attachment devices was needed. This was a particular requirement for high speed industrial applications, where down time for reloading would represent a significant loss in revenue and thus make the use of the system less desirable than other ways of providing a similar result.

As a special requirement of any stock which may be suitable for industrial applications it is also necessary that the down time due to system jamming be kept at an absolute minimum.

Accordingly, a new and improved stock was also required which would at all times be positively controllable as it is being carried and fed into the dispensing device.

In particular it is most important that the stock be such that it is one integral unit with no loose ends or portions. In this way positive control during feeding and alignment of the stock in the dispensing apparatus may be insured and thus less frequent system jamming and less down time will result. This aspect, i.e., that the stock be one integral unit with no loose ends or parts, is also important since the preferred manner of storing the stock is on a roll or folded over itself in a compressed stock arrangement. If there were loose ends or parts such as the bottom or heads 32 in U.S. Pat. No. 3,103,666, tangling would also occur if the stock was rolled up or folded over itself as shown herein.

It is also extremely desirable that no projecting bars 32 such as shown in U.S. Pat. No. 3,103,666 be present to insure that the stock does not intermesh and jam during feeding from a compressed stored configuration as shown herein.

Another important feature of the stock of this invention is that the fastener attachment members formable therefrom may be formed in the dispensing apparatus during dispensing with equal length end bars on either side of the cross link member. In the preferred configuration of the attachment device the cross link is coupled to the end bar between the ends thereof and most preferably intermediate the ends thereof.

The attachment device of this invention also provides a most important advantage in that the fastener attachment bars may be simultaneously fed through one or more needles to couple a button having one or more holes to material or join two or more pieces of material together. It may also be preferable as shown herein that end bars not show above the bottom or top of one of the material surfaces.

BRIEF SUMMARY OF THE DISCLOSURE

The present disclosure provides a new and improved wasteless fastener attachment stock particularly suitable for use in forming in a dispensing apparatus, fastener attachment devices preferably of an H shape which may then be dispensed by the dispensing apparatus.

The plastic stock of this invention comprises two individual, elongated and continuous plastic side members having a plurality of plastic cross links coupled to and between each of said side members and preferably spaced equidistantly apart from each other. The disclosure also illustrates various apparatus for forming and dispensing fastener devices formed from the aforementioned stock as well as containers, e.g., a canister for storing the stock in a compressed or non planar state prior to it being fed into a dispensing apparatus.

DETAILED DESCRIPTION OF THE PREFERRED EMBODIMENT

Figure 1:
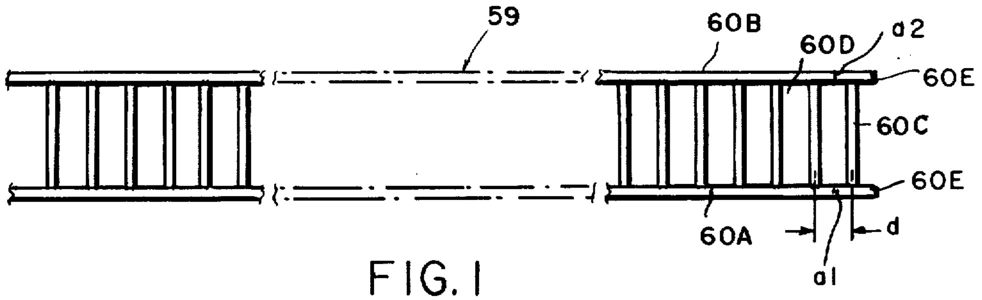
FIG. 1 is a top view of a length of fastener attachment device stock according to the invention.
Figure 3:
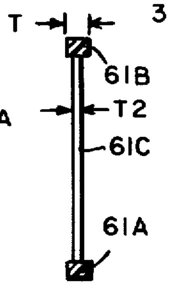
Figure 2:
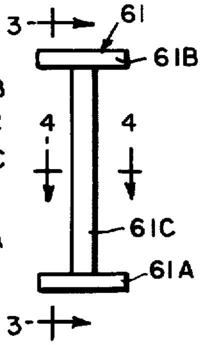
FIG. 2 is a front view of one of the attachment devices formed from the stock shown in FIG. 1.

Reference should now be had to FIGS. 1-3 for a description of fastener attachment stock according to the disclosure. The stock is shown at 59 and includes two elongated, continuous and undivided plastic side members 60A and 60b and a plurality of plastic cross links 60C coupled to and between the side members 60A and 60B such that an aperature, space or hole 60D is left between the cross links and side members.

The stock 59 is preferably of a plastic material. Most preferably the plastic material is flexible at least in part and is also sufficiently stiff in at least a portion thereof so that a portion thereof may easily be pushed through a needle slot as will be shown later in this disclosure.

Additionally, in certain applications involving the coupling of buttons, it is highly desirable that the stock also be resilient. The plastic material forming the side members is also preferably of the type so that it may easily be separated or divided by rupturing, severing, cutting or etc., as shown herein to provide a plurality of fastener attachment devices, but not so easily separable into a plurality of attachment devices that is separates upon being fed into a dispensing apparatus and thus causes jamming of the apparatus.

As used herein and for convenience it is intended that the term plastic be given its broadest meaning as defining any flexible plastic or flexible polymer such as elastomeric materials, thermoplastics and flexible thermosetting resins which those skilled in the art will recognize as useful for the purpose disclosed herein.

Materials which may be used herein are conventional plastics such as nylon, polyurethane, polyethylene, polyethylene, polypropylene, polyvinyl chloride, etc. Other plastics suitable for this purpose will be apparent to those skilled in the art. Reference may also be had to U.S. Pat. Nos. 3,444,597, 3,103,666 and 3,470,834 among others for a further teaching of plastic materials which may be useful herein. It should be understood that combinations of plastic materials may be used as the stock.

In its preferred construction the two side members are preferably parallel to each other and the cross links are also preferably parallel to each other. In addition, each of the cross links are preferably spaced an equidistance "d" apart so they may easily be fed into a fastener attaching apparatus in a preset sequence necessary for the regular timed operation of most machines.

Figure 4:
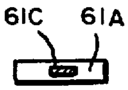
FIGS. 3 and 4 are sectional views taken along lines 3—3 and 4—4 in FIG. 2.

As shown in FIG. 1 the side members also preferably extend beyond the first cross link at 60 so that the first separation of a fastener attachment device shown in FIGS. 2–4 will from the beginning be useful for its intended purpose.

The cross links or the side members of the stock may also be stretched as disclosed in U.S. Pat. No. 3,444,597 and U.S. Pat. No. 3,470,834 to strengthen plastic materials such as nylon.

The stock 59 may be fabricated by punching or forming aperatures 60D in an extruded sheet of plastic as will be seen later with reference to FIGS. 49 and 50.

In FIGS. 2–4 there is disclosed a fastener attachment devive resulting from the separation of one device from the stock e.g., by cutting the side members 60A and 60B between the first and second cross links at $a^1$ and $a^2$ in FIG. 1.

The resulting fastener attachment device comprises two end bars 61A and 61B preferably of the same length coupled together by a filament member 61C. In this configuration the cross section of the end bar is rectangular as is the cross section of the filament member 61C.

Preferably the filament member (as well as the cross link) has a thickness $T^1$ which is smaller than the thickness $T^2$ of the end bar (side member) when viewed in the cross sectional view (see FIG. 3) to insure secure travel through a needle as will be described herein.

Figure 5:
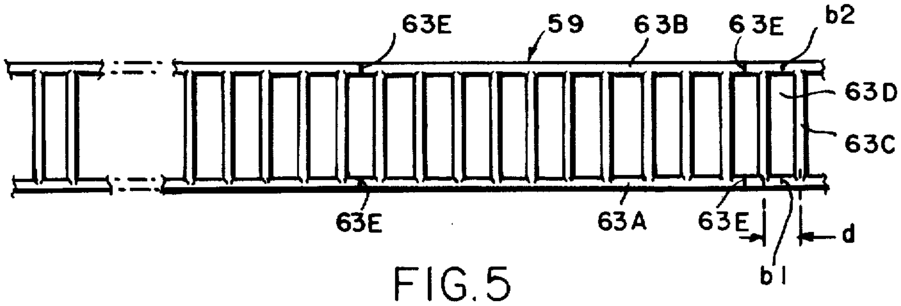
FIG. 5 is a top view of a length of fastener attachment device stock formed in a different configuration than that of FIG. 1.
Figure 6:
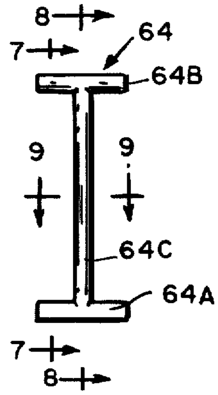
FIG. 6 is a front view of one of the attachment devices formed from the stock shown in FIG. 5.
Figure 7:
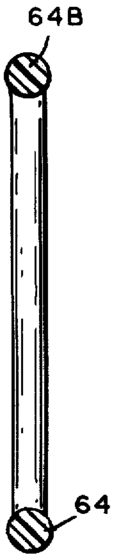
Figure 8:
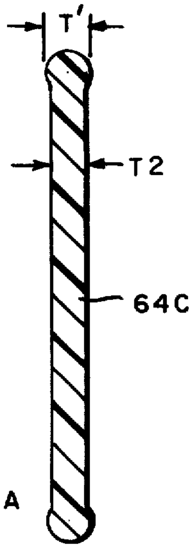

Reference should now be had to FIG. 5 as well as FIGS. 6–8 which show a slightly different configuration of the fastener attachment stock and a resultant fastener attachment device after separation from the stock at points $b^1$ and $b^2$ (see FIG. 5).

Figure 9:
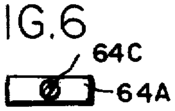
FIGS. 7, 8 and 9 are sectional views taken along lines 7—7, 8—8 and 9—9 in FIG. 6.
Figure 51:
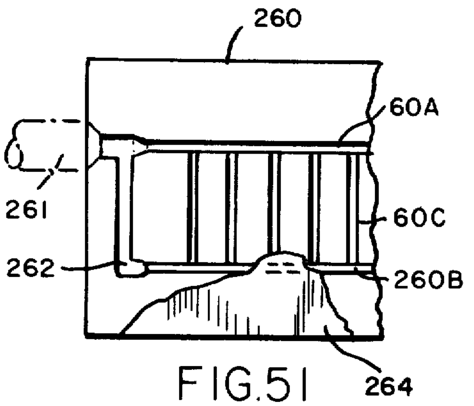
FIGS. 51-53 illustrate another method of forming the stock according to this disclosure and then stretching it to strengthen the cross links thereof.
Figure 53:
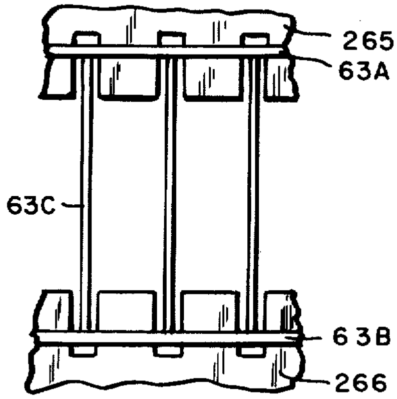

In FIG. 5 the stock is preferably made by molding, as for example as shown in FIG. 51, in relatively small sections and then both welded together as shown in FIG. 53. In particular, the stock also (shown as 59) in FIG. 5 comprises side members 63A and 63B and cross links 63C separated from each other by aperatures 63D. The stock is formed by welding together side members of molded sections at points 63D. In this manner the continuous, undivided, elongated side members 63A and 63B are formed. FIGS. 7–9 illustrate a fastener attachment device separated from the stock of FIG. 5 by severing the side members at points $b^1$ and $b^2$.

The construction of the stock of FIG. 5 is such that the end bars 64A and 64B are round in cross section as is the filament 64.

More particularly, it is preferred that the cross link 263 be molded with a smaller diameter or thickness $T^2$ than the diameter or thickness $T^1$ of the side members 63A and 63B to insure that the resulting attachment device 64 will be securely retained within the needle of the fastener attachment apparatus as will be described.

It should also be understood that if desired the thickness of the filament 64C may be greater than or equal to the thickness of the end bars 64A or 64B depending upon the application although for dispensing through a needle as disclosed herein so as to insure reliable dispensing the thickness of the cross links should be less than the thickness of the side members so that the side member will securely ride in the central wider portion of the needle slot with the cross link positioned in the narrow portion of the needle slot. (See FIG. 15 which from a top view shows the slot being wider for passage of the side member with a narrower portion for holding the cross link).

It should also be understood that the side members and the cross links as well as the resulting end bar and filament may take many shapes, as for example the filament may be round and the end bars rectangular or vice versa.

Figure 10:
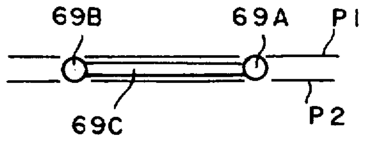
FIG. 10 is a front view showing stock of the disclosure to provide the fastener attachment device of FIGS. 6-9 confined between two parallel planes.

Reference should briefly be had to FIG. 10 which illustrates the fastener stock 59 having round side members 69A and 69B and rectangular cross links 69C. FIG. 10 illustrates in a front view, stock 59 to illustrate that the stock is planar in construction and that in most preferred construction the stock is entirely positionable between two parallel planes $P_1$ and $P_2$ defined by the top and bottom of the side members 69A and 69B. It should be understood that the side members or cross links may take various other shapes such as oval, triangular, octagonal, etc., and in addition it should be understood that side members may be of different dimensions from such each other to provide a tab such as shown in U.S. Pat. No. 3,444,597.

In some cases to facilitate machine separation of devices from the stock if tough to separate materials are used, the side members may be formed with weakened areas.

Figure 11:
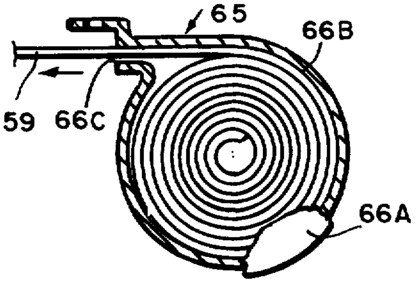
FIGS. 11 and 12 illustrate two ways of storing the stock in a container such as a round canister or a rectangular canister from which it may be dispensed.
Figure 12:
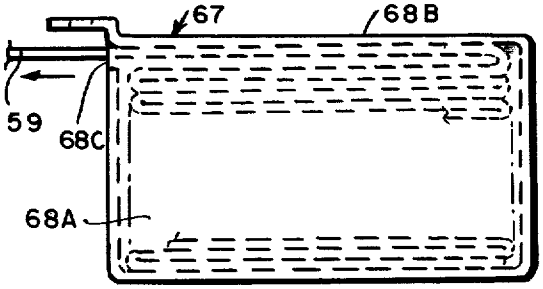
Figure 13:
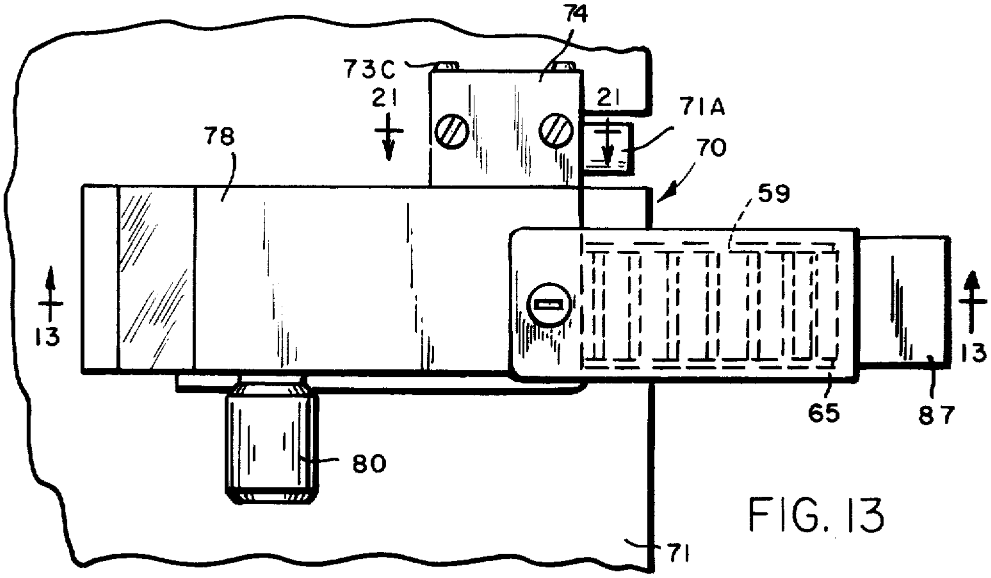
FIG. 13 is a top of a dual needle apparatus for forming fastener attachment devices shown in FIGS. 2-4, or 6-9 from the stock shown in FIGS. 1, 5 or 10 and then dispensing the device through the needles and into the material.

In FIGS. 11 and 12 there is shown a container, can or canister in two convenient shapes for storing the fastener attachment stock of this disclosure. FIG. 11 illustrates at 65 a round canister for storing fastener attachment stock 59 in a roll as shown.

For use, the stock may first be rolled up and placed in the canister 65 by removing the press fit cover 66A from the canister body 66B and inserting the roll with a portion of the stock being passed through a feed opening 66C.

The stock 59 will travel as shown by the arrow when pulled from the canister. In FIG. 12 there is shown a box like container 67 in which fastener attachment stock folded back and forth over itself as shown may be stored. The container 67 comprises a removable cover 68A which is coupled to the main storage portion 68B thereof. The cover 68A is removed for loading of the stock after the stock is folded e.g., by removing screws (not shown) holding it in place, and is then replaced to hold the fan folded stock in place. The stock is withdrawn from the container 67 via a slot or opening 68C and is pulled in the direction as shown by the arrow to feed a fastener attachment apparatus.

In order to show the manner in which the new and improved fastener attachment stock may be used, there is disclosed in FIGS. 13–48 various new and improved fastener attachment apparatus constructions as well as some of the uses to which the fastener attachment provided from the stock 59 may be applied.

Figure 18:
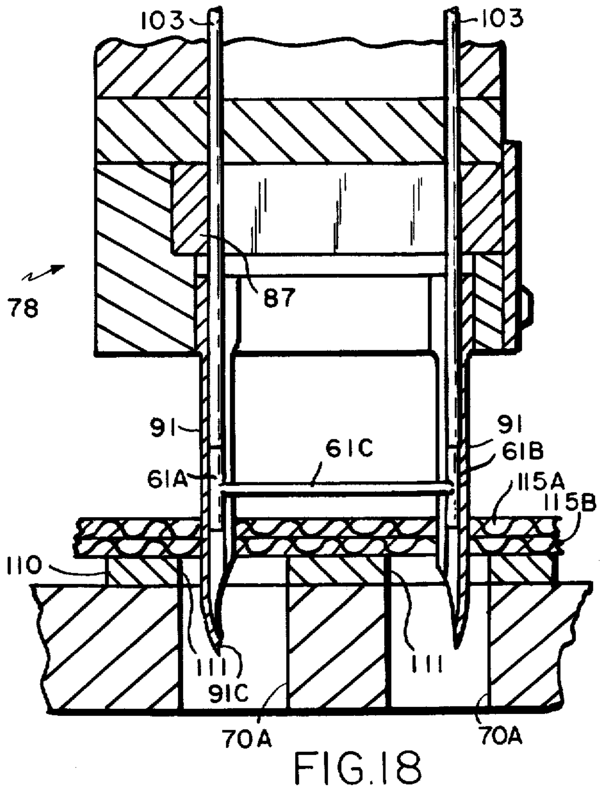
FIG. 18 is a view similar to FIG. 17 but with the plungers within the needles while pushing the fastener attachment device therethrough and after the needles have penetrated through the material.
Figure 19:
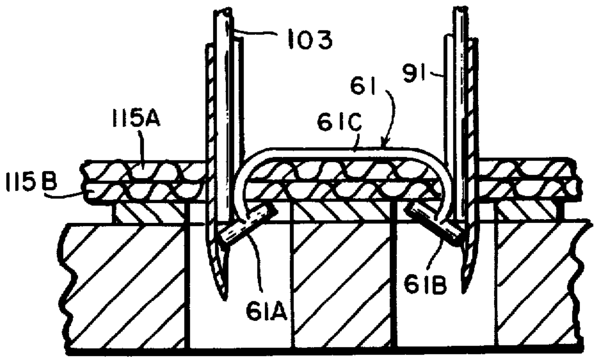
FIG. 19 is a view similar to FIG. 18 showing the plungers pushing the fastener attachment device end bars out of the needles to fasten two layers of material together.
Figure 20:
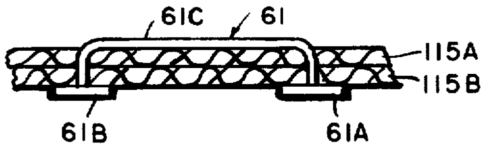
FIG. 20 illustrates the attachment device holding the layers of material together.
Figure 39:
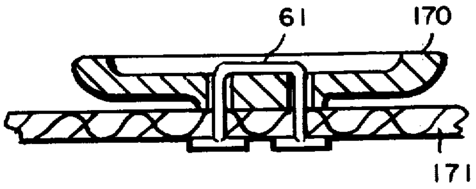

In FIGS. 13-22 there is illustrated a dual needle fastener attachment apparatus for separating the stock into fastener attachment devices and then simultaneously inserting both end bars thereof via the two needles through material to accomplish the results shown in FIG. 20 and FIG. 39.

For convenience of explanation henceforth all fastener attachment devices will be indicated by the number 61.

Figure 21:
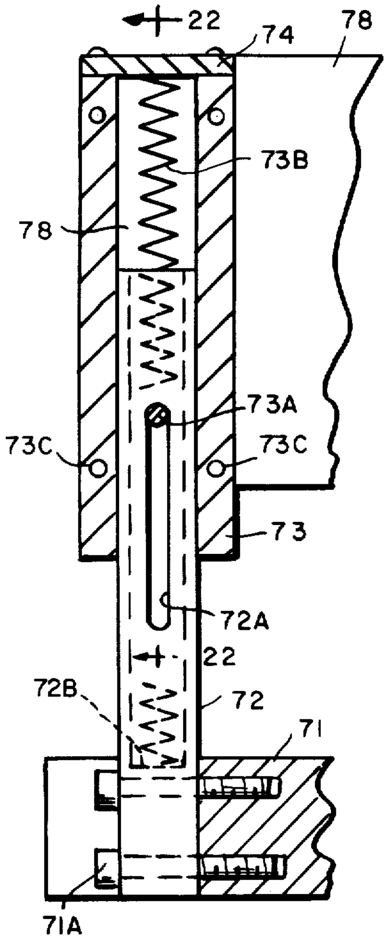
FIG. 21 is a sectional view taken along line 21—21 in FIG. 14.
Figure 22:
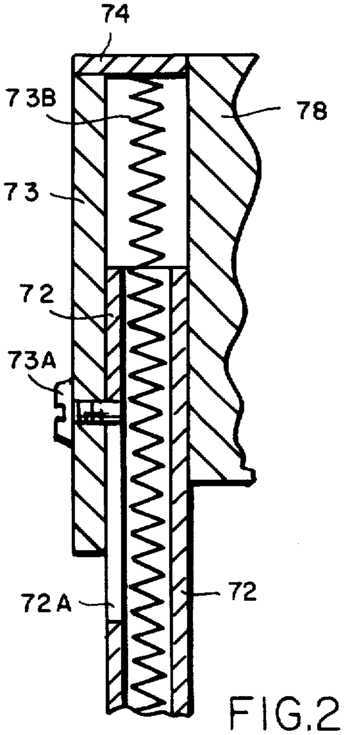
FIG. 22 is a sectional view taken along line 22—22 in FIG. 21.

The dual needle apparatus is shown at 70 and comprises a base 71 which supports an upright member 72 by bolts 71A (see FIG. 21). The upright member 72 is partially hollow and includes a motion limit slot 72A.

Figure 14B:
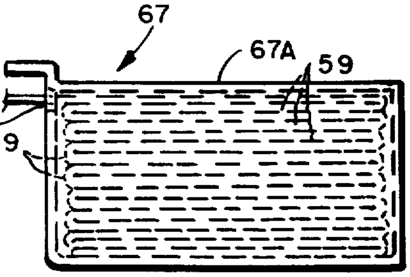
FIG. 14B illustrates another stock container which may be substituted for the container in FIG. 14.
Figure 14:
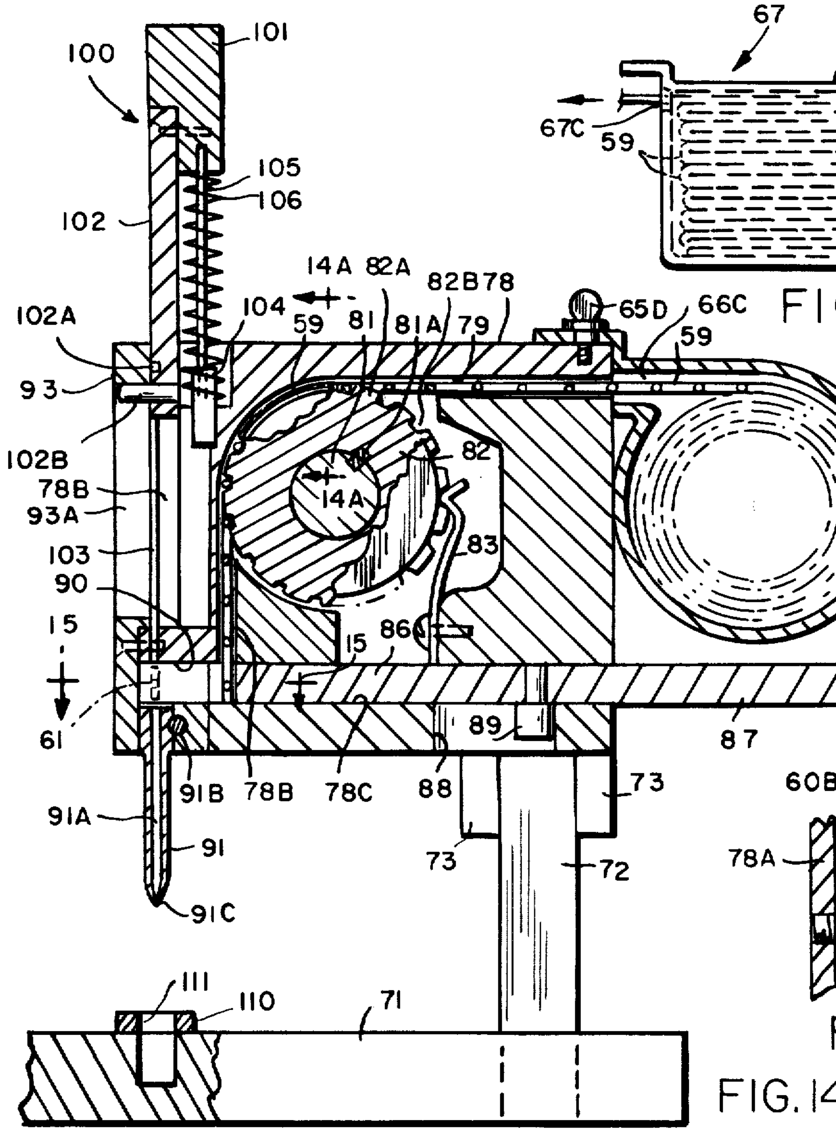
FIG. 14 is a sectional view taken along line 14—14 in FIG. 13

The top portion of the upright member 72 is slidable within housing walls or members 73 (3 in number) capped with a top member 74. Supported by one of the three members 73 is a motion limit screw positioned within the slot 72A. The members 73 are in turn coupled to the main body 78 of the apparatus by bolts 73C which supports the needles and the other operating parts of the apparatus. Within the member 72 there is provided a resilient biasing means such as a spring 73B which extends into the area between the housing walls 73. The top of the spring is positioned against the top member 74 and the lower part of the spring rests on a shelf 72B in the interior of the member 72. The spring 73B acts to maintain the body 78 in a raised position as shown in FIGS. 14 and 21 while the pin 73A limits the downward movement of the body 78 against the spring 73B when the body is manually forced downward (See FIG. 18).

The body 78 includes a feed slot 79 to permit the flow of stock 59 from the container 65 coupled by a 65D to the body as shown. The stock 59 upon entering the body is positioned on means which as a wheel 82 for feeding the stock into the apparatus in order to separate the stock 59 into the devices 61.

The wheel 82 has a plurality of raised portions 82A which fit into the aperatures 60D and the stock 59 and carries to cross links in open ended grooves 82B (see FIGS. 14 and 14A) with the side members on either side of the projection 82A.

The wheel 82 is mounted on a shaft 81 and is keyed thereto by a key 81A for rotation therewith. The shaft 81 is supported for rotation by the side wall 78A of the body in a conventional manner (see FIG. 14A) and coupled to a knob 80 for advancing it. Wheel 82 motion is retarded by a spring detent 83.

The stock is forced by the feed means 82A through a guide slot 78B into a horizontal slot 78C (open in parts) formed in the body 78. Positioned within the slot 78C is a member 87 which acts in combination with member 90 to separate devices 61 from the stock 59 after the stock 59 is urged and positioned against the bottom of the slot 78C.

The means 87 also positions the separated devices 61 (see FIG. 14) at a location to be dispensed via needles 91. The member of carrier 87 is more clearly shown in FIGS. 15 and 16 and includes a guide and retaining slot portion 87A into which the stack 59 is initially fed. The member 87 is manually urged to the left of FIG. 14 to separate the stock 59 at points $a^1$- $a^2$ or at other points along the side members 60A and 60B to provide the fastener attachment device 61.

The member 87 or the member 90 or both may also carry knives to effect separation of the stock 59 into devices. Also a separate moving knife apart from member 87 may also be used if desired.

All of the above is intended to be included in the definition of means for separating or dividing the stock 59 into a plurality of devices 61.

The movement of the member 87 is limited by a bolt 89 positioned in a cutout 88 formed in the body 78. In order to drive the end bars of the device 61 through the needles 91 there is provided an end bar pusher mechanism comprising a top member 101 supporting a member 103 having a slot 102A for supporting two needle plungers 103 (see FIG. 17).

Figure 17:
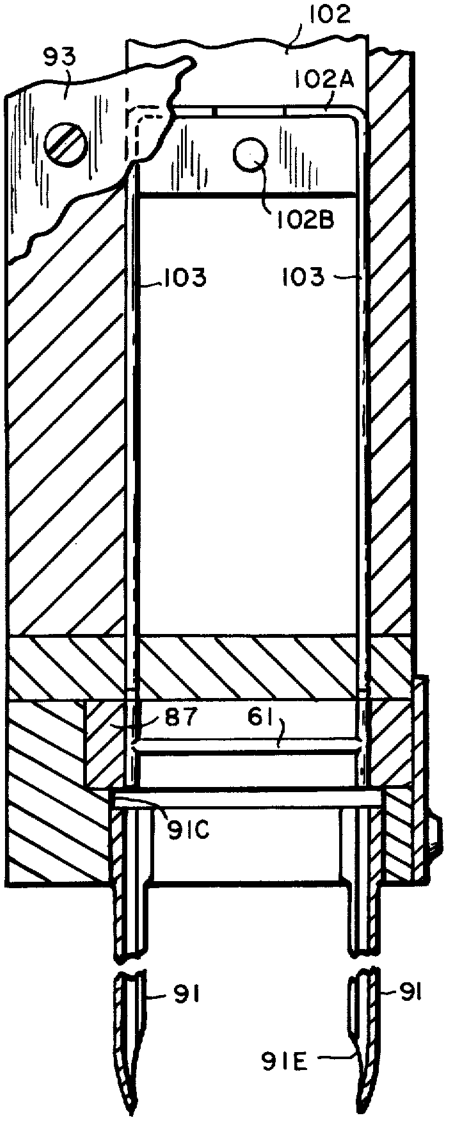
FIG. 17 is a sectional view taken along line 17—17 in FIG. 16 illustrating a pair of plungers about to push the fastener attachment device end bars through a pair of needles.

The member 102 is slidable in a guide slot 78B formed in the body 78 and is held in place within the slot by a plate 93 coupled to the body 78 by screws as shown in FIG. 17.

The plate 93 has a limit shot 93A formed therein in which there is positioned a limit pin 102B supported by member 102. The members 101, 102 and the pushers 103 (coupled to member 102) are urged upwardly by a spring 106 supported by a rod 105 slidably mounted in a member 104 having a bore (shown dotted). In this manner the pushers or plungers 103 are retained above the mouth of the needles.

Figure 14A:
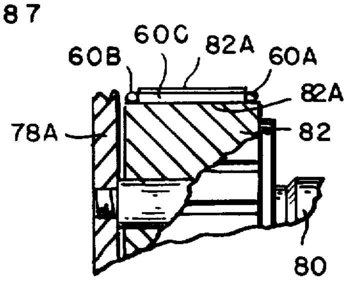
FIG. 14A is a partial sectional view taken along line 14C—14A in FIG. 14.
Figure 15:
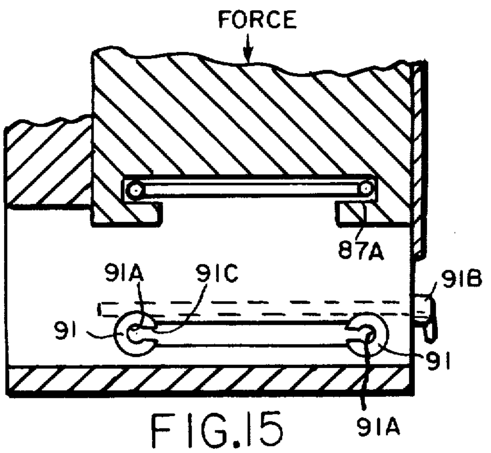
FIG. 15 is a sectional view taken along line 15—15 in FIG. 14 with the means for dividing the fastener attachment stock in a first position to receive the fastner attachment stock.
Figure 16:
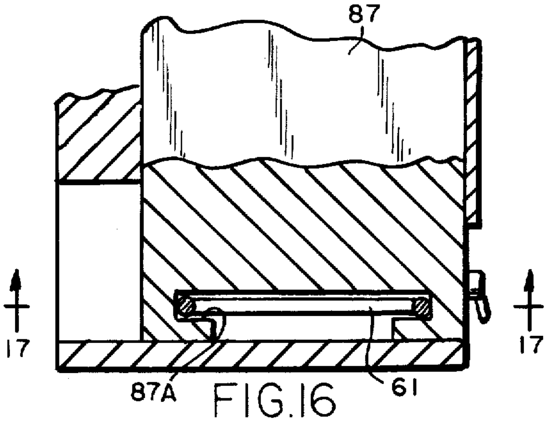
FIG. 16 is a view similar to FIG. 15 but with the means for dividing the fastener attachment stock in a forward position after forming one fastener attachment device from the fastener attachment stock.

At 110 there is a raised platform having a bore 111 through which the needles may extend. Briefly, the operation of the apparatus shown in FIGS. 14-22 is as follows:

1. stock 59 is fed into the body 78 from the container or canister 65 containing a roll or coil of the stock or from the canister 67 (see FIG. 14B) containing the stock in a fan fold configuration and is positioned on the wheel 82 as shown in FIG. 14A for processing in the apparatus;

2. the knob 80 is rotated to bring the stock side member ends 60E (see FIG. 1) against the bottom of slot 78C and through the guide slot 87A in the member 87;

3. the member 87 is then pushed to the left of FIG. 14 to divide or separate a fastener attachment device e.g., H shaped, by forcing the side members 60A and 60B of the stock 59 against an edge surface of member 90 (see FIG. 15). This is affect results in a severing, rupturing or cutting of the side members 60A and 60B to form a fastener attachment device 61 depending upon the edge configuration and sharpness;

4. thereafter the carrier member 87 now holding the device 61 is moved to the left of FIG. 14 to the point where the device end bars 61A and 61B are positioned above the slots 90A of the two needles 91 (see FIGS. 15 and 16). The device 61 is preferably somewhat wedged or tightly fits into the slot 86A so that it moves easily with the carrier member 86. The needles as shown are held in place by locking means 91B and each having a slot 91A to accommodate the end bar thickness and a narrower portion 91C to permit the narrower thickness filament portion 61C to extend therethrough. In this manner the fastener attachment device end bars 61A and 61B is securely held within the needles when the end bars travel therethrough;

5. assuming now that two pieces of material 115A and 115B are positioned as in FIGS. 18 and 19 one on top of the other on the platform 110, the body 78 is then forced downwardly to drive the needle tips 91C through the material as shown in FIGS. 18 and 19 and into the bores 111 and 70A;

6. at this time the member 101 is urged downwardly (see FIG. 18) to force the plungers 103 to push the device 61 end bars 61A and 61B respectively through (preferably simultaneously) the needle slots 91A with the filament 61C extending between the needles 91;

7. when the plungers 103 extend downwardly as shown to the point shown in FIG. 19, the end bars 61A and 61B are urged or pop out of needle wide cutaway portion 91E thereby providing for a coupling of the layers of material together as shown in FIG. 20. The plastic material used for the device 61 preferably has enough return in it to cause it to assume the shape shown in FIG. 20.

It should be understood that the sequence of operations described herein may be modified without departing from the invention. For example, the body 78 may first be forced downwardly to pierce the material with the needles, the carrier member 87 may then be moved to divide the stock 59 and position the device 61 and thereafter the pushers 103 may be forced downwardly.

Figure 23:
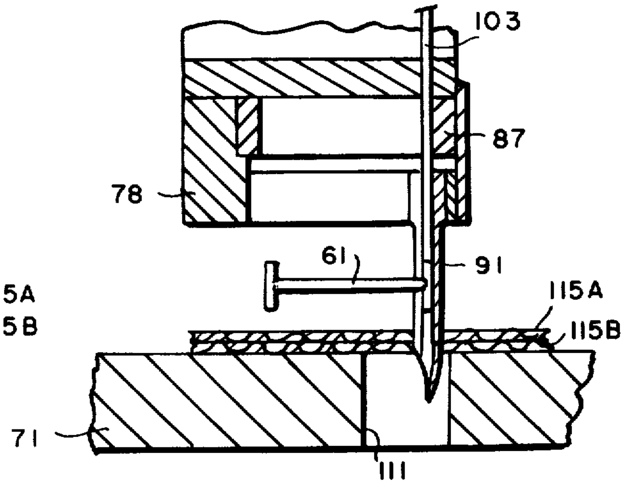
FIG. 23 is a sectional view similar to FIG. 18 showing one plunger and one needle for inserting one end bar of a fastener attachment device through layers of material.
Figure 25:
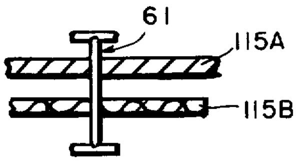
FIG. 25 illustrates the fastener attachment device inserted as shown in FIGS. 23 and 24 holding two layers of material together.
Figure 24:
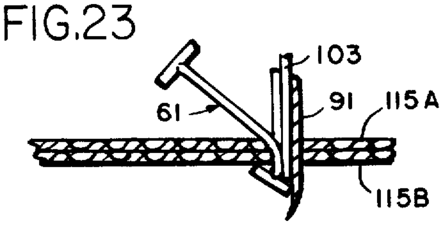
FIG. 24 illustrates the fastener attachment device of FIG. 6 popping out of needle in FIG. 23.

Reference should now be had to FIGS. 23–25 for a description of a modification of the apparatus of FIGS. 14–22.

In this embodiment, one needle 91 is used instead of two so that only one end bar 61A is driven through the needle and the cloth 115A and 115. By merely removing the needle which would normally be on the left of FIG. 23, the end bar 61B will move freely downwardly as the plunger 103 pushes the end bar 61A through the needle 91 to the point where it springs outwardly from the needle as shown in FIG. 24. FIG. 25 represents the device 61 shown coupling the two layers 115A and 115B together.

Figure 26B:
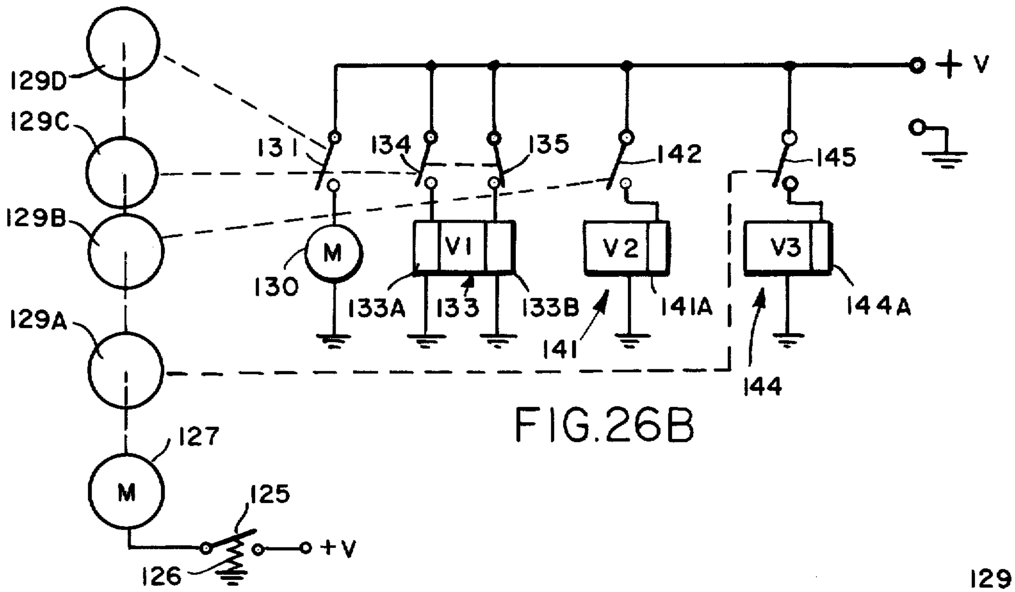
FIG. 26B represents in block form a circuit for operating the apparatus of FIG. 26.
Figure 26A:
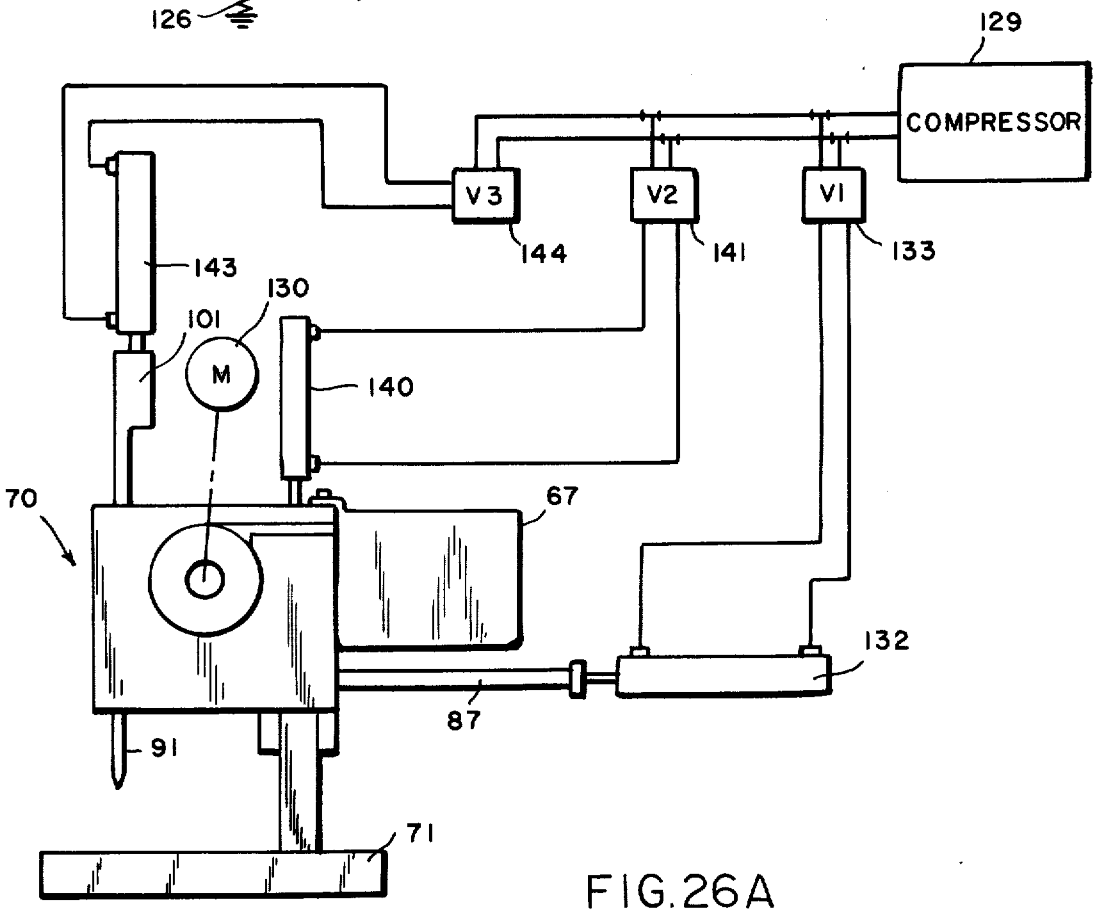
FIG. 26A illustrates a powered system for controlling the operation of the apparatus of FIGS. 13-24.

In FIGS. 26A and 26B there is schematically shown, an automated implementation for the apparatus shown in FIG. 14. In order to operate the various parts of the machine, that is to feed the stock by rotating the wheel 82 the carrier moves member 87 to separate the device 61 from the stock and position them for dispensing through the needles 91, move the machine body 78 to do that the needles 91 pierce the material, and drive the plungers 103 (via member 101) through the needles to force the device end bars 61A and 61B therethrough, there are provided a plurality of fixed in place fluid operated cylinders 132, 140, and 143 having piston rods 132A, 140A and 148A and a stepping motor 130 mounted to the apparatus 70.

In order to provide fluid e.g., compressed air or gas (oil, or hydraulic fluid may also be used) there is provided a compressor pump 129. The passage of fluid back and forth into the cylinders is controlled by solenoid control valves 133, 141 and 144.

Valve 133 is shown in block and may be a four way two solenoid valve (the solenoids are as shown in 133A and 133B) such as shown in U.S. Pat. No. 3,306,144 and the valves 141 and 144 are also shown in block may be the three way valve one solenoid and spring return also shown in U.S. Pat. No. 3,306,144.

In order to control the solenoids 133A, 133B, 141A and 144A of the valves shown in FIG. 26A, there is diagrammatically shown at 125 a foot pedal as may be used in the garment industry having a spring return 126.

The motor drives a shaft 128 having a plurality of shaped timing cams 129A–129B supported thereon for rotation therewith.

The cams are used to operate cam followers (shown dotted) to control the opening and closing of switches 131, 142, 145 and ganged switches 134 and 135.

By actuation the motor 127, the aforementioned switches coupled to solenoids 133A, 133B, 141A and 144A of valves 133, 141 and 144 are sequentially controlled to control machine operation as heretofore described. In addition, switch 131 will provide a signal to step the stepping motor 130 to feed the fastener attachment stock.

In FIGS. 27–36, there is disclosed a further feature of the apparatus of the disclosure which permits it to couple various sized buttons 162A-C (see FIG. 32) having a variety of spacings in button holes to be attached to material such as a fabric (e.g., to a coat).

In all major details the apparatus disclosed in these figures are identical with the apparatus of FIG. 14 except that the needles and plungers therefore are mounted to permit buttons having different hole spacings to be coupled to fabric without the requirement of a new machine for each new dimensioned button.

Figure 27:
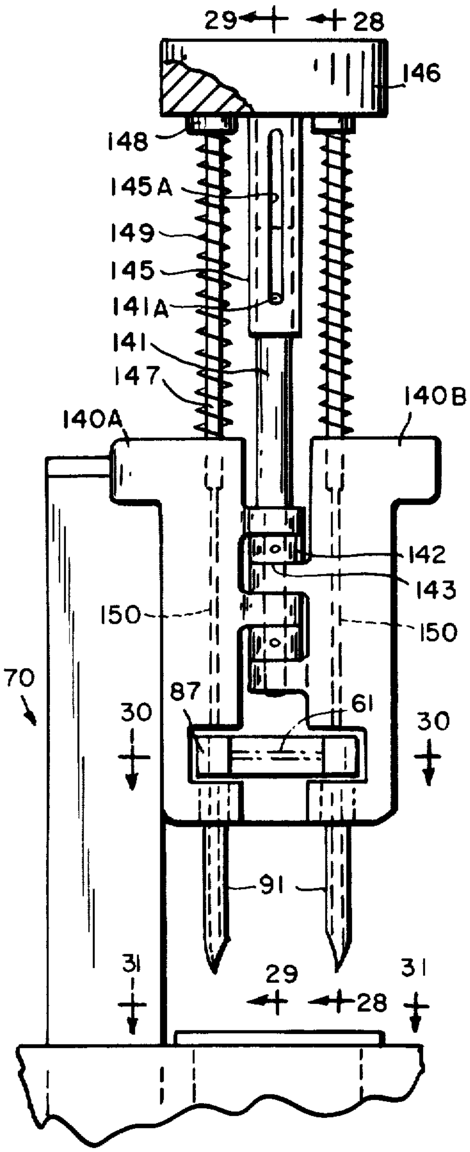
FIG. 27 represents in a front view a modification of FIGS. 13-22 to permit the aligning of the needles with respect to holes of different size buttons shown in FIG. 32.
Figure 28:
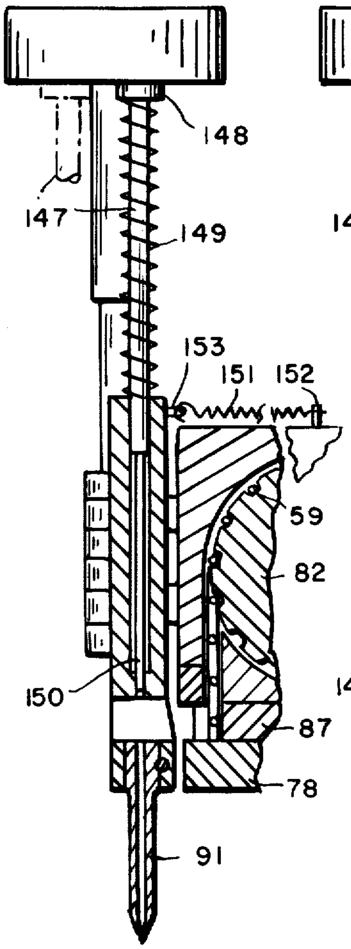
FIGS. 28 and 29 are sectional views taken along lines 28—28 and 29—29 in FIG. 27.
Figure 29:
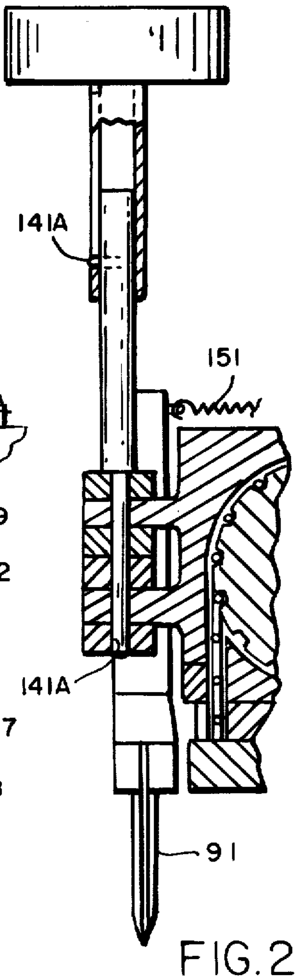
Figure 30:
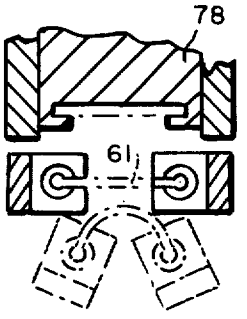
FIG. 30 is a sectional view taken along line 30—30 in FIG. 27 showing in phantom rotation of the needles.
Figure 31:
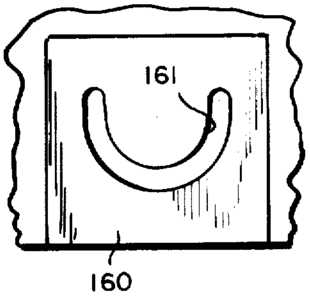
FIG. 31 is a top view looking down from line 31-31 in FIG. 27.
Figure 32:
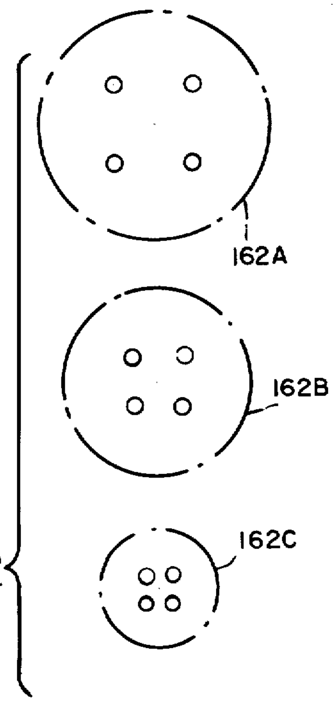
FIG. 32 illustrates three different size buttons which may be attached to material as shown in FIGS. 37-39 herein.
Figure 33:
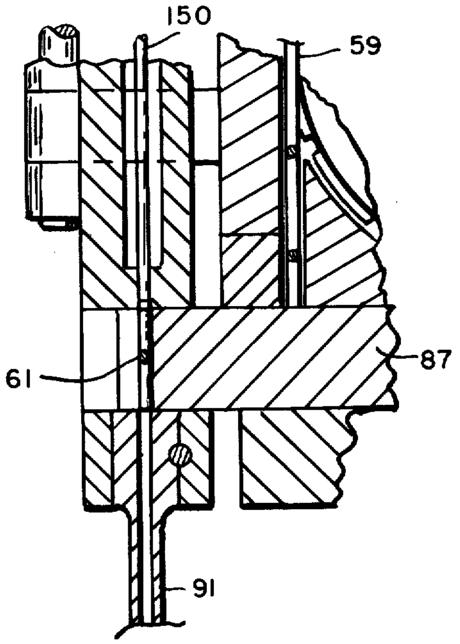
FIGS. 33 -36 illustrate in sectional view similar to FIG. 28 the steps for forming or dividing an attachment device from said stock, forcing it into the needles and then positioninng the needles as shown in phantom in FIG. 30.

In FIGS. 27–29 there are shown two pivotal members 140A and 140B positioned on a rod 141 having a narrower portion 141A. The members 140A. 140B and 141 are supported by a body 78 extension member 142. The wider portion of the rod rests on top of pivotal member 140B and thus is prevented from moving downwardly. The members 140A and 140B support for slidable motion a plunger member comprising a top portion 148 slidable with respect to a top pusher member and movable in an arc about the bottom surface of member 146.

The top portion 148 is urged against member 146 by a spring 149 positioned about a central portion 147 resting on the members 140A and 140B. The lower end of the pusher member includes a narrow rod 150 adapted to fit within the slot 91A of the needles 91 to push a fastener attachment device 61 into and through the needle.

The extent of pusher motion is limited by pin 141A coupled to the rod 141 and which is positionable in a slot 145A formed in the wall of a cylinder member 145. The cylinder member 145 is coupled at its top to member 146 as shown.

Figure 34:
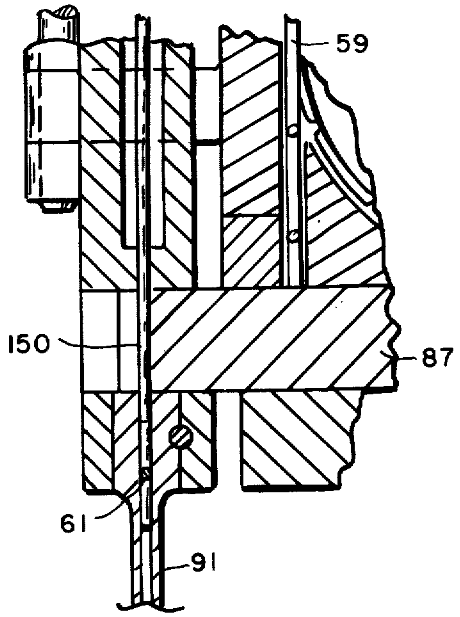
Figure 35:
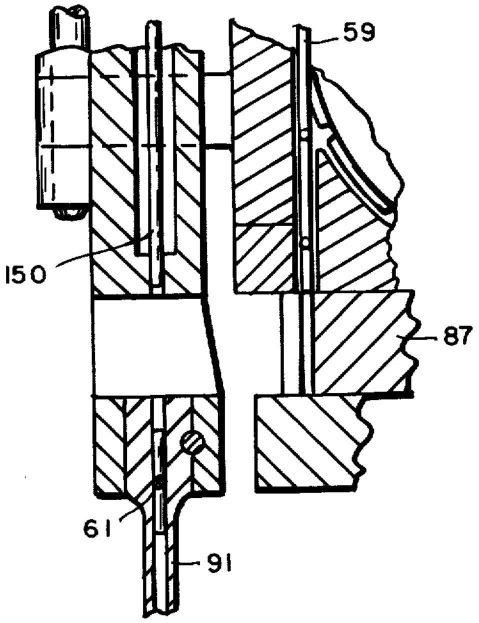
Figure 36:
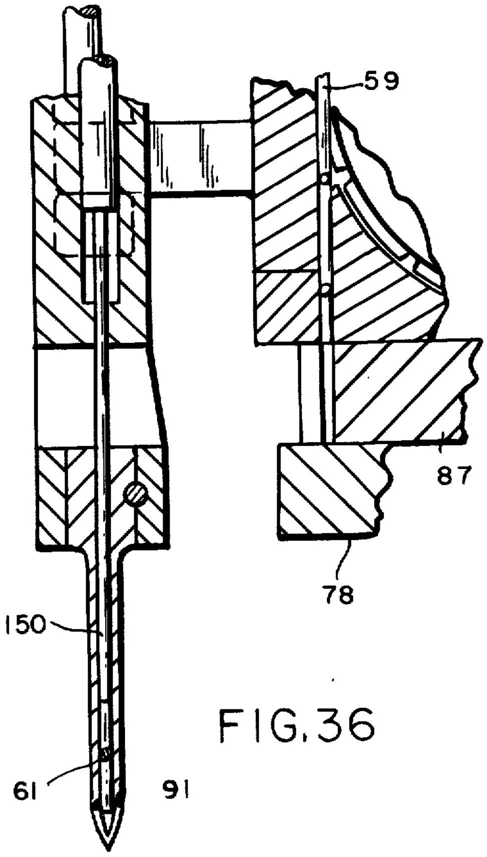
Figure 40:
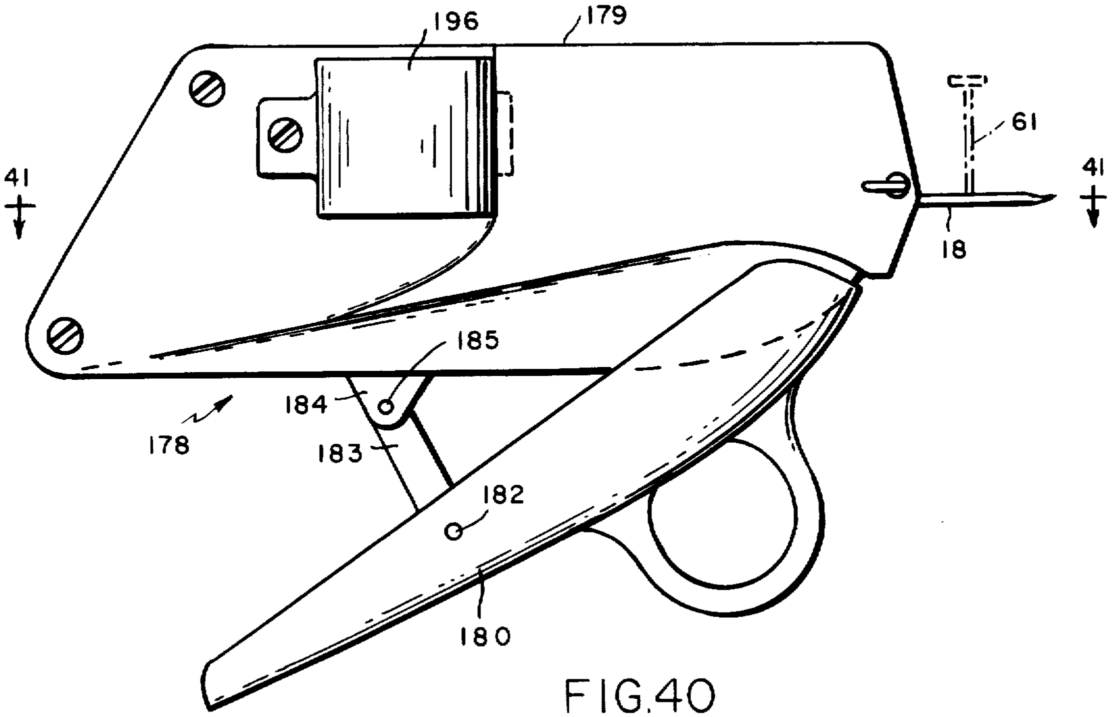
FIG. 40 illustrates in a side view a hand operable apparatus for forming fastener attachment devices from the fastener attachment stock and then dispensing the devices.
Figure 37:
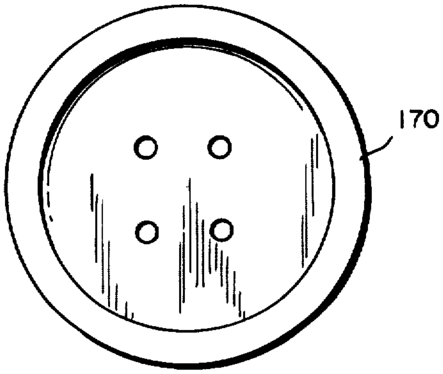
FIGS. 37-39 illustrate respectively in a top view a button, the button attached by fastener devices to material and in a sectional view showing the button coupled to material.
Figure 38:
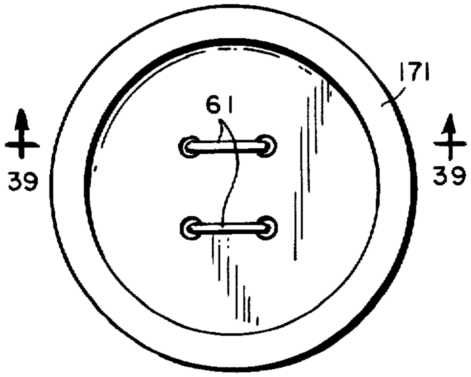

The operation of the apparatus of FIGS. 27–29 is briefly as follows:

a. a button 170 and fabric 171 are positioned on the member 160 having an arc like channel 160 (see FIG. 31) through which the needles may extend to deposit end bars of a fastener attachment device 61 below the fabric 171 (see FIGS. 37–39);

b. a device 61 positioned within the carrier 87 slot 87A is moved over the needles after being separated from the stock 59 as heretofore explaned;

c. thereafter, the member 146 is urged downwardly to cause member 150 to push the end bars of the member 61 into the top portion of the needle 91 as shown in FIG. 34;

d. the members 87 and the rods 150 are withdrawn as in FIG. 35;

e. at this point the pivotal members 140A and 140B are rotated (see FIG. 30) to locate them over two adjacent button holes of the bottons shown in FIGS. 37–39;

f. the body 78 is then forced downwardly as heretofore described to extend the needles 91 through the button holes, the fabric therebelow and into the channel 160 (like in FIG. 18); and g. now the rods 150 are reinserted into the needle slots 91A as shown in FIG. 36 to drive the end bars of the device 61 through needles 91 which already extend through the button holes and the fabric to deposit the end bars as shown in FIG. 39.

Reference should now be had to FIGS. 40–47 which illustrate a hand operatable fastener attachment apparatus 178 using the principles of the apparatus shown in FIGS. 13–24 to dispense a fastener attachment device 61 separated from the stock 59.

The apparatus 178 comprises a body 179 to which there is pivotly attached a handle 180 at point 181. The handle drives a link 183 coupled thereto at 182 to rock back and forth a gear segment 184 pivotly coupled to the link at 185 and to the body at 184A.

Figure 42:
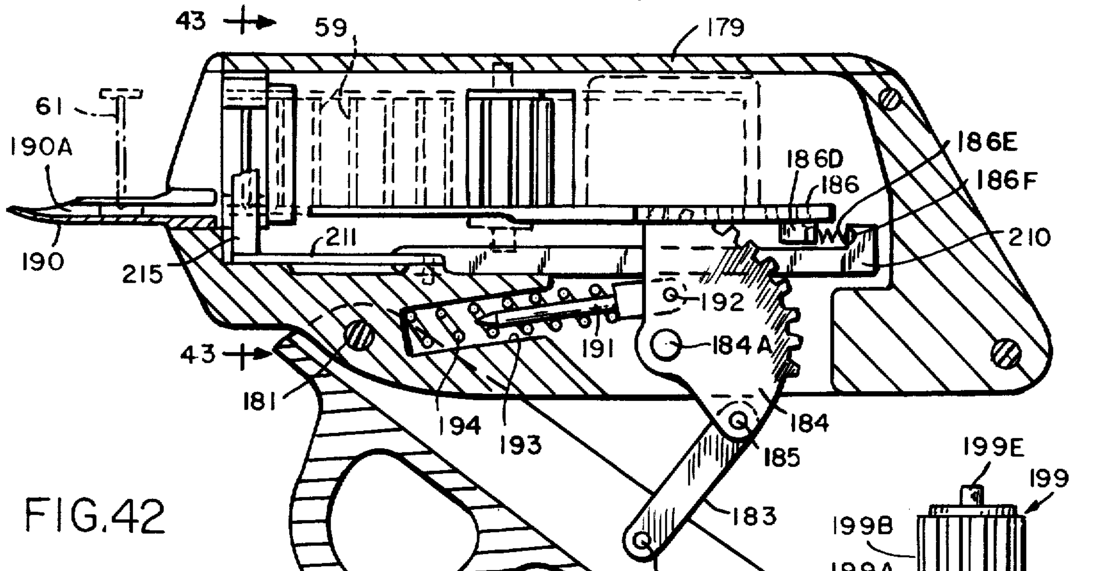
FIG. 42 is a sectional view taken along line 42—42 of FIG. 41.
Figure 46:
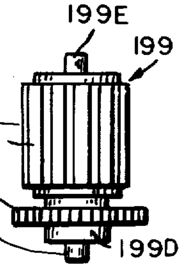
FIG. 46 illustrates in a side view the feed wheel of FIGS. 41 and 42.

The gear segment is urged to the right of FIG. 42 by a spring 194 positioned in a body cavity 193 which forces a pin like member 191 pivotly coupled at 192 to the gear segment 184. The gear segment 184 drives a plunger 186 by gear teeth positioned in cutouts 186A.

For a further description of this type of drive system reference may be had to my U.S. patent application Ser. No. 169,413 filed on Aug. 5, 1971.

The stock 59 is stored in a container 196 in a rolled up configuration about a pin 196 container being detachable from the body 174 via screw 197. The stock 59 is passed through a container opening 196B and then threaded through slot 198 over feed wheel 199 of the type as previously disclosed.

The feed wheel 199 comprises ridges 199A between cavities 199B to support the stock 59. The ridges fit within the aperature 60D with the links 60C and side members 60A and 60B positioned thereabout as previously disclosed with reference to FIG. 13.

The wheel portions are supported by a conventional one way roller or clutch mechanism so that it will rotate to feed stock in one direction. A one way roller mechanism may be purchased from the Torrington Company of Connecticut under the designation Torrington's "Drawn Cup Overrunning Roller Clutch" and modified as shown herein, and another type of one way roller is also disclosed in U.S. Pat. No. 3,652,001.

The one way roller is driven via gear 199C coupled thereto (see FIG. 46) which is in turn driven by gear teeth 186C of member 186. The feed wheel is mounted on shaft members 199E supported by bores formed in the body and accessible by removing the top of the body.

Figure 43:
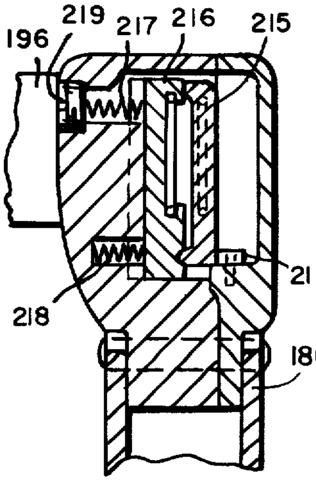
FIG. 43 is a sectional view taken along line 43—43 of FIG. 42.
Figure 44:
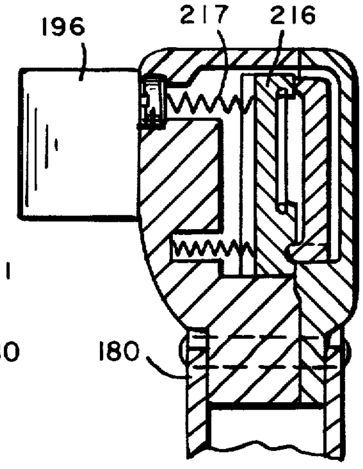
FIG. 44 is a view similar to FIG. 43 after the fastener attachment device has been formed from the stock.

The stock 59 is fed into a carrier member 216 (of the type 87 previously disclosed) which is urged to the right of FIGS. 43 and 44 by springs 217 and 218, the spring 217 being supported at its rear against plug 219.

Figure 47:
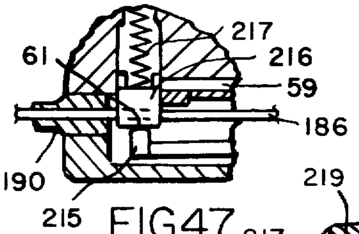
FIG. 47 illustrates in a top view the position of the means for dividing the stock after providing a fastener attachment device therefrom and positioning it for dispensing through a needle.
Figure 41:
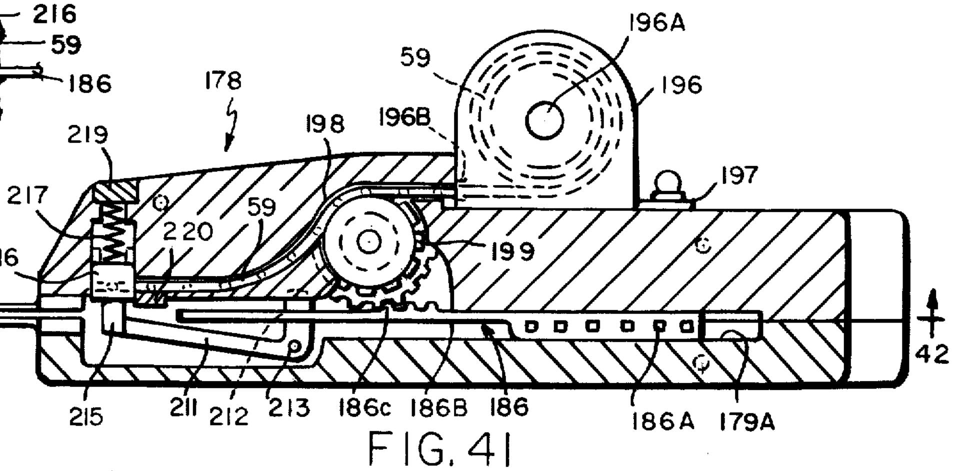
FIG. 41 is a sectional view taken along line 41—41 of FIG. 40.

The stock is divided or separated 61 into fastener attachment devices by the engagement of the side members of the stock against member 220 as shown in FIGS. 41 and 47, as the carrier member moves under spring pressure from the position shown in FIG. 43 to the position shown in FIG. 44. FIGS. 44 and 47 illustrate the carrier member holding one fastener attachment device 61 in position for it to be pushed through the slot 190A of needle 190 by the plunger member 186.

Figure 45:
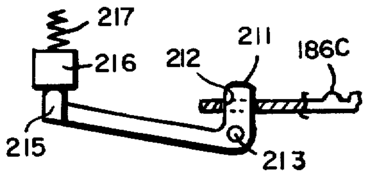
FIG. 45 is a diagrammatical view showing the parts for dividing the stock into fastener attachment devices.

In order to return the carrier member after the dispensing of a fastener attachment device 61, there is provided a pivotal member 211 which extends through a cutout 212 in the slidable member 210 and is pivotly supported by pin 213 (see FIGS. 42 and 45).

On the advance stroke of member 186, the member 210 is free to move forward therewith after a spring 186E supported by member cutouts 186D and 186F fully expands. Thus under the pressure of springs 217 and 218 the member 216 moves to the right of FIG. 43 to the position shown in FIGS. 44 & 47 and thus rotates the member 211 about pin 213 which at this time is free to rotate due to the advance of member 186.

Upon the opening of handle 180, the member 210 is driven rearwardly by member 186 to rotate member 211 clockwise (see FIG. 41) and return the carrier member 216 to the position shown in FIG. 43 where it can now receive the stock 59.

In this device the stock 59 is fed into the carrier member 216 on the return stroke as member 186 begins to compress spring 186E and the gear teeth 186C engage the gear teeth of gear 199C.

In summary, the operation of the hand actuable fastener attachment apparatus of FIGS. 40–47 is as follows:

a. stock is fed into the carrier member 216;

b. the handle 180 is compressed causing the member 186 to move forward thus permitting the separating of one fastener attachment device 61 from the stock and the positioning of the device to be pushed through the needle 190;

c. the member 186 then continues to move forward to engage an end bar of the fastener attachment device 61 and push it through the needle;

d. on the return stroke and under the pressure of spring 194 the member 186 is withdrawn from the needle causing the return of the carrier member 216 and then the feeding of the stock 59 into carrier member 216 to ready the apparatus for its next use.

Figure 48:
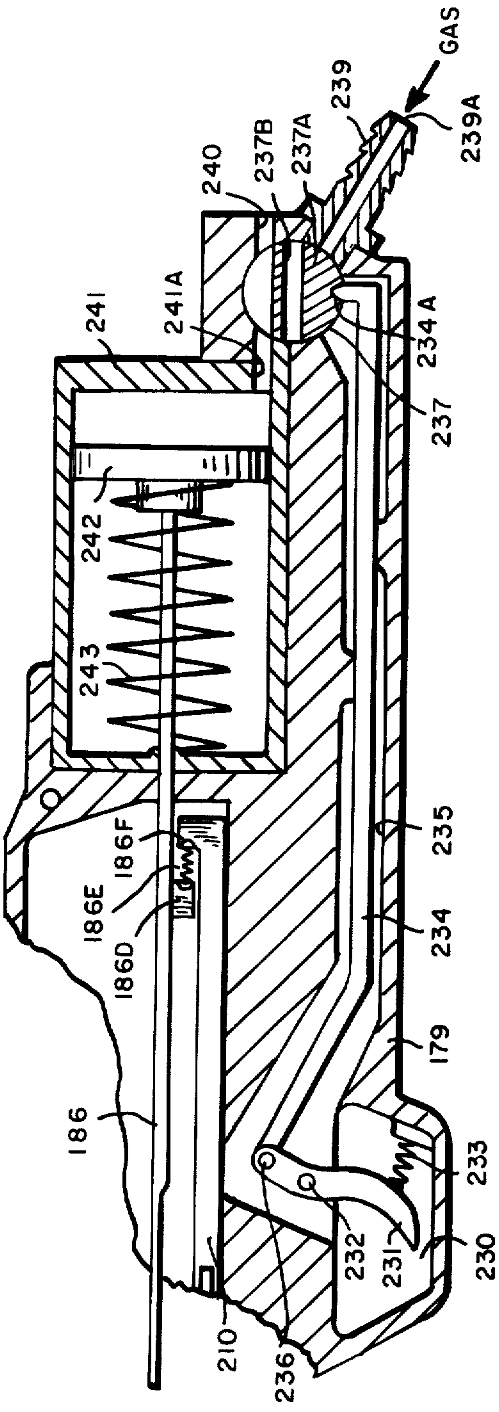
FIG. 48 illustrates the device of FIG. 40-47 modified to be operated by power means.

Reference should now be had to FIG. 48 which illustrates a powered (e.g., fluid or electric powered) version of the apparatus of FIGS. 40–47. All elements are the same except that the member 186 is driven by a modified version fluid operated system as shown in my U.S. Pat. No. 3,659,769.

In this FIG. fluid such as compressed air or gas is controllably fed into a cylinder 241 by a trigger 231 operating a valve 237. The trigger is pivotly mounted at 232 to the body and is positioned in a finger hole 230. Pulling the finger 231 backwards against return spring 233 causes the slidable rod 234 pivotly coupled at 230 to the trigger 231 to move to the right of FIG. 48. Finger 234A of the rod 234 thus rotates the valve member 273 having solid portions 237A positioned for rotation in a cavity formed within the body and a passageway 237 extending through a portion thereof as in FIG. 11 of U.S. Pat. No. 3,659,769.

In its rotated position gas shown by the arrow travels through a bore 239A of a plug 239 thence through the passageways 237B and 241A to move the piston 242 to the left of FIG. 48.

In this manner the piston 242 compresses the return spring 243 to drive the member 186 to the left of FIG. 48. Upon release of the trigger 231, the member 234 moves left rotating the valve member 237 to the position shown in FIG. 48 to exhaust the gas from cylinder through port 240. The return spring 243 then returns the piston 242 and the member 186 coupled thereto to provide the functions previously described with reference to FIGS. 40–47.

Figure 49:
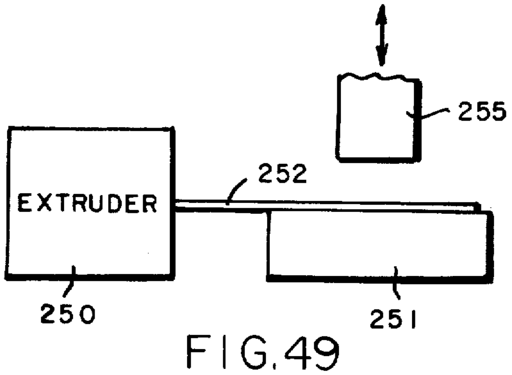
FIGS. 49 and 50 illustrate one method of forming the stock according to this disclosure.
Figure 50:
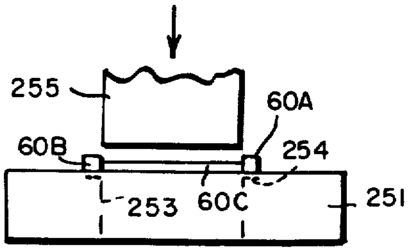

At this time reference should be had to FIGS 49–54 which illustrate various methods for fabricating the stock 59. FIGS. 49 and 50 disclose an inexpensive and convenient manner for fabricating the stock according to the disclosure. The stock 59 is formed by providing an extruded continuous strip of plastic 252 from an extruder in the configuration shown in FIG. 50 and then punching out or forming apertures, by applying a force to a punching member 255 to move it up and down to form the apertures (leaving the side members and cross links) as the strip moves in a direction to the right of FIG. 49 while the strip 252 passes over the table 251. The punched out portions of the strip pass through an opening 253 in the table. Stock such as shown in FIG. 1 is conveniently formed in this manner although obviously various other shaped stock may also be formed.

In FIG. 51 there is shown a method of molding the stock in a mold 260 by forming into the mold plastic under pressure into channels 264A formed in a mold top 262 and bottom 264 and then cooling or curing depending upon the plastic used. Stock 59 having side members 60A and 60B with cross links 60C is thus formable.

Figure 54:
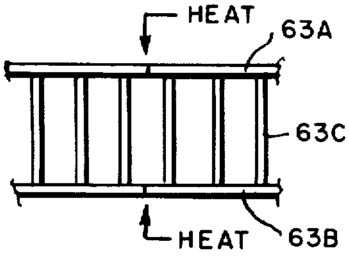
FIG. 54 illustrates a method of joining short lengths of stock together to form lengths of stock.

Smaller sections formed in this manner may be joined together by applying heat e.g., from a laser, ultrasonic means and other conventional heating devices as shown in FIG. 54 to butt weld the side members 63A and 63B of each section together, said side members supporting the cross links 63C.

Figure 52:
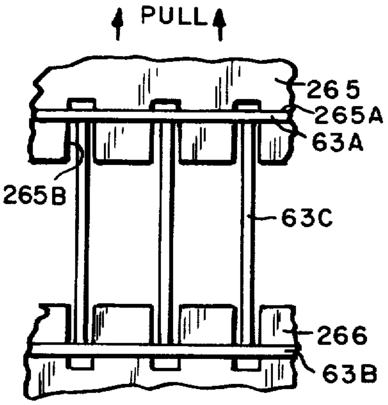

In FIGS. 52 and 53 there is illustrated the stretching of the cross links 63C of the stock by puller members 265 and 266 having slots 265A and 265B to hold the side members and cross links during the stretching operation to strengthen as well as elongate stock made from materials such as nylon exhibiting a crystalline structure and which will be strengthened by stretching. Conveniently such crystalline structure materials may be heated during stretching to facilitate stretching.

It will thus be seen that the purposes set forth above for this invention have been efficiently attained and since certain changes may be made in carrying out the methods and in the constructions set forth, it is intended that all matter contained in the following description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. Fastener stock comprising
two continuous and elongated plastic side members that are cross coupled by a plurality of cross links;
said stock being proportioned to be fed as a unit to a position where individual fasteners are separated therefrom within a machine;
one of said side members being proportioned so that each separated fastener includes a bar formed from a portion of the side member and is configured for feeding through the bore of a hollow needle having a longitudinal slot for passage of the associated cross link; and
each cross link being foldable towards the associated end bar that is feedable through said hollow needle.

2. Fastener stock as defined in claim 1 wherein said cross links are uniformly spaced between said side members.

3. Fastener stock as defined in claim 1 wherein said side members are of identical construction.

4. Fastener stock as defined in claim 1 wherein said side members have a circular cross section.

5. Fastener stock as defined in claim 1 wherein the cross section of said cross links is less than that of said side members.

6. Fastener stock as defined in claim 1 wherein the cross section of said cross links is greater than that of said side members.

7. Fastener attachment stock as defined in claim 1 wherein the cross links have their molecules reoriented by stretching to strengthen them with respect to at least one of said side members.

8. Fastener attachment stock as defined in claim 1 wherein said stock is formed by molding.

* * * * *